United States Patent
Heffels et al.

(10) Patent No.: US 12,241,831 B2
(45) Date of Patent: Mar. 4, 2025

(54) MEASURING FACILITY AND METHOD FOR THE MEASUREMENT OF AT LEAST TWO DIFFERENT COMPONENTS OF A FLUID

(71) Applicant: Siemens Aktiengesellschaft, Munich (DE)

(72) Inventors: Camiel Heffels, Stutensee-Büchig (DE); Konstantin Harr, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 216 days.

(21) Appl. No.: 17/739,924

(22) Filed: May 9, 2022

(65) Prior Publication Data
US 2022/0357274 A1   Nov. 10, 2022

(30) Foreign Application Priority Data

May 10, 2021 (EP) ..................................... 21173079

(51) Int. Cl.
*G01N 21/64* (2006.01)
(52) U.S. Cl.
CPC . *G01N 21/6402* (2013.01); *G01N 2021/6471* (2013.01); *G01N 2021/6482* (2013.01)
(58) Field of Classification Search
None
See application file for complete search history.

(56) References Cited

U.S. PATENT DOCUMENTS

| | | | |
|---|---|---|---|
| 4,573,796 A | 3/1986 | Martin et al. | |
| 4,746,490 A * | 5/1988 | Saneii | B01J 19/0046 422/111 |
| 4,751,189 A * | 6/1988 | Rocklin | G01N 30/96 436/178 |
| 4,801,726 A * | 1/1989 | Giese | G01N 33/54306 556/419 |
| 4,968,429 A * | 11/1990 | Yen | B01D 65/08 210/652 |

(Continued)

FOREIGN PATENT DOCUMENTS

| | | |
|---|---|---|
| CN | 101652653 A | 2/2010 |
| CN | 110987911 A | 4/2020 |

(Continued)

OTHER PUBLICATIONS

"UV-Vls Luminescence Spectroscopy, Theoretical Principles", in: https://teaching.shu.ac.uk/hwb/chemistry/tutorials/molspec/lumin1.htm# Mar. 25, 2022.

*Primary Examiner* — David P Porta
*Assistant Examiner* — Djura Malevic
(74) *Attorney, Agent, or Firm* — Henry M. Feiereisen LLC (57) ABSTRACT

In a method for measuring at least two different components of a fluid, the fluid is to a first measuring cell and a second measuring cell. In the first measuring cell, a first component of the fluid is excited by a first excitation to trigger a first light emission, and in the second measuring cell, a second component of the fluid is excited by a second excitation which is different from the first excitation, thereby triggering a second light emission. The first light emission and the second light emission are captured by an optical system facility and guided by the optical system facility in a direction of a detector facility which measures the first light emission and the second light emission.

12 Claims, 6 Drawing Sheets

(56) References Cited

U.S. PATENT DOCUMENTS

| | | | | |
|---|---|---|---|---|
| 5,149,661 A * | 9/1992 | Gjerde | G01N 30/84 | 436/178 |
| 5,183,740 A * | 2/1993 | Ligler | G01N 33/54366 | 436/538 |
| 5,387,525 A * | 2/1995 | Munkholm | G01N 21/643 | 436/103 |
| 5,389,523 A * | 2/1995 | Plant | G01N 35/085 | 435/7.92 |
| 5,393,673 A * | 2/1995 | Gjerde | G01N 35/08 | 436/171 |
| 5,503,805 A * | 4/1996 | Sugarman | C07K 1/047 | 422/131 |
| 5,641,459 A * | 6/1997 | Holmberg | B01J 19/0046 | 422/112 |
| 5,649,576 A * | 7/1997 | Kirk | B01J 19/0046 | 250/222.2 |
| 5,807,525 A * | 9/1998 | Allen | B01J 19/0046 | 422/62 |
| 5,861,125 A * | 1/1999 | Shively | B01J 19/0046 | 422/535 |
| 5,879,881 A * | 3/1999 | Rubenstein | G01N 33/54366 | 436/523 |
| 5,935,779 A * | 8/1999 | Massey | G01N 21/76 | 435/7.1 |
| 6,110,749 A * | 8/2000 | Obremski | G01N 33/54373 | 385/12 |
| 6,126,904 A * | 10/2000 | Zuellig | B01J 19/0046 | 422/138 |
| 6,159,426 A * | 12/2000 | Palmer | G01N 33/54366 | 210/198.2 |
| 6,271,039 B1 * | 8/2001 | Palmer | G01N 33/582 | 436/166 |
| 6,290,915 B1 * | 9/2001 | Palmer | B01J 19/0046 | 422/138 |
| 6,344,336 B1 * | 2/2002 | Palmer | G01N 33/54366 | 436/514 |
| 6,475,803 B1 * | 11/2002 | Ueno | C08B 37/0012 | 436/166 |
| 6,503,760 B2 * | 1/2003 | Malmqvist | G01N 33/543 | 435/7.1 |
| 6,955,760 B2 * | 10/2005 | Iwata | G01N 30/462 | 210/101 |
| 7,244,395 B2 * | 7/2007 | Olstowski | G01N 33/287 | 436/175 |
| 7,576,037 B2 * | 8/2009 | Engelhardt | C40B 60/14 | 506/37 |
| 7,608,460 B2 * | 10/2009 | Reed | G01N 21/7703 | 436/163 |
| 7,805,081 B2 * | 9/2010 | Lundquist | G01J 3/2803 | 398/140 |
| 8,183,052 B2 * | 5/2012 | Reed | G01N 21/645 | 436/171 |
| 8,465,697 B2 * | 6/2013 | Erickson | F04B 49/106 | 422/68.1 |
| 8,497,134 B2 * | 7/2013 | Reed | G01N 21/80 | 422/50 |
| 9,040,307 B2 * | 5/2015 | Reed | G01N 21/81 | 436/163 |
| 9,062,205 B2 * | 6/2015 | Reed | C07D 493/10 | |
| 2008/0180661 A1 | 7/2008 | Brown et al. | | |
| 2010/0118301 A1 * | 5/2010 | Vondras | G01N 33/0042 | 356/318 |
| 2012/0037817 A1 * | 2/2012 | Vondras | G01N 33/0042 | 250/206 |
| 2012/0322161 A1 * | 12/2012 | Reed | G01N 21/81 | 436/163 |
| 2021/0132019 A1 | 5/2021 | Osterlaenger et al. | | |
| 2021/0272654 A1 * | 9/2021 | Thaker | G16B 45/00 | |

FOREIGN PATENT DOCUMENTS

| | | |
|---|---|---|
| CN | 110998288 A | 4/2020 |
| DE | 102013224463 A1 | 5/2015 |
| WO | WO 99/08115 A1 | 2/1999 |

* cited by examiner

MEASURING FACILITY AND METHOD FOR THE MEASUREMENT OF AT LEAST TWO DIFFERENT COMPONENTS OF A FLUID

CROSS-REFERENCES TO RELATED APPLICATIONS

This application claims the priority of European Patent Application, Serial No. 21173079.1, filed May 10, 2021, pursuant to 35 U.S.C. 119(x) (d), the disclosure of which is incorporated herein by reference in its entirety as if fully set forth herein.

BACKGROUND OF THE INVENTION

The invention relates to a measuring facility and to a method for the measurement of at least two different components of a fluid.

The following discussion of related art is provided to assist the reader in understanding the advantages of the invention, and is not to be construed as an admission that this related art is prior art to this invention.

Minimum requirements and test procedures for automatic measuring facilities for monitoring emissions from stationary sources are described, for example, in standard DIN EN 15267-3. The measurement of nitrous oxide ($NO_r$) is required for this. It involves a sum of the gas components NO and $NO_2$. In addition, the measurement of nitrous oxides also plays a large part despite the fact that the decarbonization of the world economy is advancing. For example, $NO_x$ emissions should still be expected in the combustion of hydrogen in gas turbines (future backup of power production from regenerative sources and in hydrogen aircraft and seagoing vessels).

To date, measuring methods for the measurement of NO or for $NO_2$ for certified measuring systems have shortcomings, e.g. that it is only possible to measure one component of the gas.

It would be desirable and advantageous to obviate prior art shortcomings.

SUMMARY OF THE INVENTION

According to one aspect of the present invention, a method for measuring at least two different components of a fluid includes feeding the fluid to a first measuring cell and a second measuring cell, exciting a first component of the fluid in the first measuring cell by a first excitation to trigger a first light emission, exciting a second component of the fluid in the second measuring cell by a second excitation which is different from the first excitation, thereby triggering a second light emission, capturing the first light emission and the second light emission via an optical system facility, guiding the first light emission and the second light emission in a direction of a detector facility, and measuring by the detector facility the first light emission and the second light emission.

Use of two different excitations, for example two different types of excitation, in two different measuring cells allows simultaneous independent measurements (of concentrations) of two different components, for example of nitrogen monoxide and nitrogen dioxide. The second measuring cell can be designed structurally separately from the first measuring cell. Advantageously, the first light emission and the second light emission can be measured simultaneously. The first light emission may be measured with a first part of the detector facility and/or the second light emission with a second part of the detector facility.

The first and the second components of the fluid can be excited and/or measured simultaneously (parallel).

According to another advantageous feature of the invention, the first excitation can be a laser excitation. Advantageously, the first component can be nitrogen dioxide. Provision may advantageously be made for use of a laser light source with a wavelength appropriate to the electronic transition into the nitrogen dioxide molecules for the laser excitation. The laser light, which can be irradiated by the laser light source, can have a wavelength of about 405 nm±10 nm.

According to another advantageous feature of the invention, the first light emission can be a Raman radiation.

According to another advantageous feature of the invention, the second excitation can be realized by dosing a reactant resulting in a chemiluminescence with the second component of the fluid. Advantageously, the reactant can include ozone or can be ozone and/or the second component can be nitrogen monoxide.

According to another advantageous feature of the invention, the first light emission can be measured using a first bandpass filter and/or the second light emission can be measured using a second bandpass filter. The first bandpass filter can operate, for example, with a central wavelength of about 477 nm and with full width of half maximum of about 10 nm. The second bandpass filter can operate, for example, with a central wavelength of about 650 nm and with full width of half maximum of about 100 nm. Advantageously, the first and second bandpass filters can be exchangeably arranged in the optical system facility for example. Provision may also be made for a use of the first and the second bandpass filters alternately or simultaneously.

According to another advantageous feature of the invention, the first light emission can include a light emission of the first component and a light emission of a further component different from the first component. The light emission of the first component and the light emission of the further component may be measured alternately or simultaneously. Advantageously, the measurement of the light emission of the first component and the light emission of the further component can be realized by using different bandpass filters, for example employed in the optical system facility.

According to another aspect of the invention, a measuring facility for measuring at least two different components of a fluid includes a first measuring cell designed to enable the fluid to be fed to the first measuring cell, an excitation apparatus operably connected to the first measuring cell and configured to generate a first excitation for exciting a first component of the fluid when the fluid is fed to the first measuring cell, a second measuring cell designed to enable the fluid to be fed to the second measuring cell, with the fluid when fed to the second measuring cell causing in the second measuring cell a second component of the fluid to be excited by a second excitation which is different from the first excitation, an optical system facility operably connected to the first measuring cell and configured to capture a first light emission triggered by the first excitation, and operably connected to the second measuring cell and configured to capture a second light emission triggered by the first excitation, and a detector facility operably connected to the optical system facility to enable the optical system facility to guide the first light emission and the second light emission in a direction of the detector facility, with the detector facility configured to measure the first light emission and the second light emission.

A measuring facility according to the invention can be designed to be sufficiently compact. For example, the measuring facility is about 35 cm×35 cm, so it can fit in a shoe box. To summarize, a measuring facility according to the invention can be designed in such a way that measurement of gases of mobile sources is possible. Furthermore, the measuring facility requires almost no sample preparation.

It is understood that the fluid flows through the first measuring cell and the second measuring cell during measurement. The first light emission is specific to or characteristic of the first component and the second light: emission is specific to or characteristic of the second component. The first and second light emissions can be different from each other, for example different in their (central) wavelength.

The excitation apparatus can be a laser light source and the first excitation can be a laser excitation. The laser light source is designed to irradiate laser light with a wavelength of about 405 nm±10 nm.

According to another advantageous feature of the invention, provision may be made for a further excitation apparatus operably connected to the second measuring cell and configured to generate the second excitation in the second measuring cell. Provision may be made for the second measuring cell tom be not pressure-resistant. The first measuring cell can be pressure-resistant and may include at least one pressure-resistant window, with each pressure-resistant window being designed as an entry optical system of the optical system facility.

According to another advantageous feature of the invention, the second measuring cell can include an inlet for the fluid, an outlet for the fluid, and a further inlet for passage into the second measuring cell of a reactant which chemically reacts with the second component of the fluid and generates a chemiluminescence emission. The further excitation apparatus can be designed as a reactant generator facility, for example as an ozone generator, which is configured to feed the reactant to the second measuring cell. Advantageously, the optical system facility can include a chamber for receiving the reactant, and the reactant can be fed to the chamber via a capillary. The chamber may have a wall shared with the second measuring cell, with the further inlet being arranged on the wall or being formed in the wall. The chamber can also be separated from the second measuring cell by a slit diaphragm, with the shared wall for example being designed as a slit diaphragm. The opening of the slit diaphragm can be arranged in a focal point of at least one lens of the optical system apparatus. The size of the opening of the slit diaphragm corresponds to the size of a photocathode of the detector facility, advantageously approximately as large as the photocathode.

The first light emission can be a Raman radiation. The second light emission can be a chemiluminescence emission and can thus be the second excitation. The measuring facility can thus be configured for simultaneous measurement of nitrogen dioxide and nitrogen monoxide. The concentrations of nitrogen dioxide and nitrogen monoxide can be simultaneously ascertained on the basis of a combined Raman and chemiluminescence measurement.

According to another advantageous feature of the invention, the optical system facility can include a first receiving optical system apparatus and a second receiving optical system apparatus. The first receiving optical system apparatus can be structurally separate from the second receiving optical system apparatus. Advantageously, the first receiving optical system apparatus can include the second measuring cell and/or the chamber.

According to another advantageous feature of the invention, the first excitation can excite in the first measuring cell in the fluid a further component of the fluid which is different from the first component, so that the first light emission includes a light emission of the first component and a light emission of the further component, with the second receiving optical system apparatus being operably connected to the first measuring cell and configured to select the light emission of the further component and to guide it in the direction of the detector facility, with the detector facility being operably connected to the second receiving optical system apparatus and configured to measure the light emission of the further component.

The further component is different from the first component and from the second component, and may be oxygen for example. Oxygen is stipulated for example as a measuring component in NOx emission measurements.

The first receiving optical system apparatus and the second receiving optical system apparatus can be adapted to select the light emission of the first component. This can be achieved, for example, in that a same bandpass filter is employed in the first receiving optical system apparatus and in the second receiving optical system apparatus.

The further light emission can be specific to/characteristic of the further component.

According to another advantageous feature of the invention, the optical system facility can include a bandpass filtering facility configured to select fluid component-specific light emissions. The bandpass filtering facility can have two or more bandpass filters. One or more of the bandpass filter(s) can have one or more interference filter(s). Different bandpass filters can have different central wavelengths and full width of half maximums. The respective central wavelengths and full width of half maximums can be selected so as to be appropriate to detection of the respective light emission.

According to another advantageous feature of the invention, the bandpass filtering facility can include a filter wheel arranged on the first receiving optical system apparatus and a further bandpass filter arranged in the second receiving optical system.

According to another advantageous feature of the invention, the optical system facility can include a first stage and a second stage, with the first stage provided for spatial filtering of the first light emission triggered in the first measuring cell, and with the second stage provided for mapping the spatially filtered first light emission onto the detector facility.

Provision may be made for an exit optical system of the first stage, which exit optical system can be designed, for example, as a focusing lens, terminates the chamber at a side opposing the wall (shared with the second measuring cell), for example the slit diaphragm. The second stage can include an entry optical system, which can be designed, for example, as a collimating lens, terminates the second measuring cell at the detector facility side, i.e. at a side opposite to the wall which is shared with the chamber.

According to another advantageous feature of the invention, the detector facility can include two structurally separate detector apparatuses, for example detectors, in particular, photomultipliers. Advantageously, the optical system facility can include two structurally separate optical system apparatuses. The detector apparatuses can be operably connected to the optical system apparatuses, respectively.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 1:
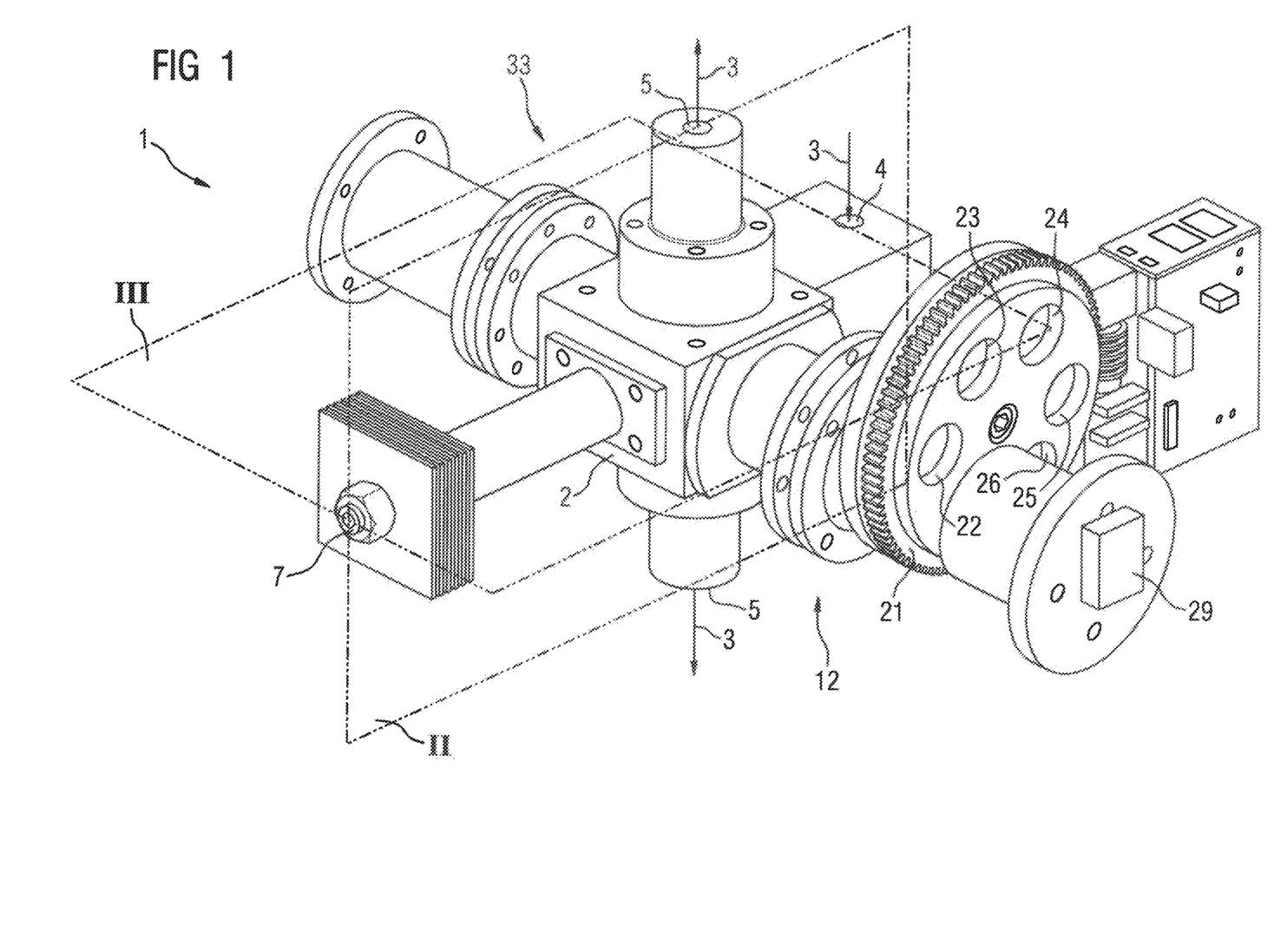
FIG. 1 shows a schematic representation of a Raman photometer in a perspective view.

Turning now to the drawing, and in particular to FIG. 1, there is shown a Raman photometer or a Raman scattered light photometer 1, which can correspond to a measuring facility accoridng to the invention. The Raman photometer 1 includes an advantageoulsy pressure-resistant (for example 10 bar), for example cube shaped, first measuring cell 2, through which a fluid 3, for example a gas, in particular an exhaust gas from a combustion, can flow at elevated regulated pressure up to 10 bar absolute. The fluid 3 can enter the first measuring cell 2 via a gas inlet 4 of a gas inlet chamber and leave the cell at two gas outlets 5. Advantageously, the gas outlets 5 are arranged at a right angle to the first measuring cell 2 and lead out of the first measuring cell 2 upwards and downwards in the drawing.

A laser light apparatus with a laser light source 7 is associated with the first measuring cell 2 and advantageously arranged on the first measuring cell 2 opposite the gas inlet chamber, and advantageously secured.

As shown in FIG. 1, the measuring facility 1 includes an optical system facility 12, 33. The optical system facility 12, 33 is likewise associated with the first measuring cell 2 and is adapted to capture light emissions 15, 45 (see FIG. 2 and FIG. 3) triggered in the first measuring cell 2 by way of a laser excitation 6 provided by means of the laser light source 7 and to map them onto a detector facility 29, 43. The optical system facility can include a first receiving optical system apparatus 12 and/or a second receiving optical system apparatus 33.

Furthermore, it can be seen in FIG. 1 that the first receiving optical system apparatus 12 includes a filter wheel 21 with a plurality of bandpass filters 20 (see FIG. 2 and FIG. 3), 22, 23, 24, 25, 26 for fluid component-specific selection of the emitted radiation.

Figure 2:
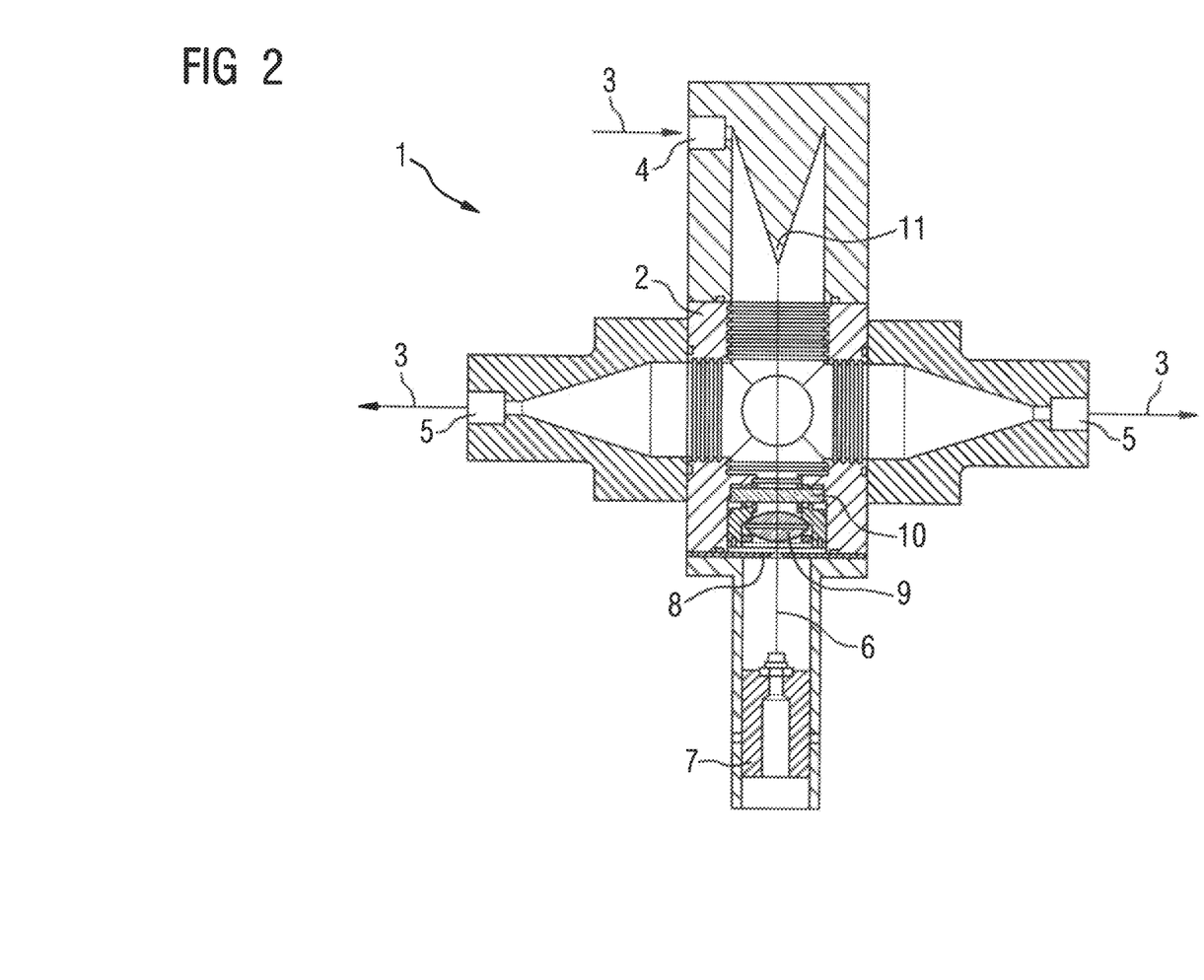
FIG. 2 shows a first sectional representation of the Raman photometer in FIG. 1.

FIG. 2 shows a sectional representation of the Rahman photometer 1. The light beam 6 of the laser light source 7 falls for example through a diaphragm 8, via a focusing lens 9 and an interference filter 10 into the measuring cell 2 and penetrates it in the direction of the gas inlet 4, where it is captured for example in a backscatter-free light trap 11. The line segment (beam waist), focused by the lens 9, of the light beam (Gaussian beam) 6 can be positioned in the center of the first measuring cell 2 in order to generate there for example a maximum light yield during the excitation of corresponding fluid components. Furthermore, the center of the first measuring cell 2 can be arranged in a focal point of the entry lenses 16, 36 of the first or second receiving optical system apparatus 12, 33.

The beam quality and line width of the laser beam 6 can be improved by a diaphragm 8 and an interference filter 10, for example a narrow band one, so the background signal in the first measuring cell 2 can be brought to a low level. The background signal can be greatly reduced, moreover, by the arrangement and configuration of the gas outlets 5 and the light trap 11.

Figure 3:
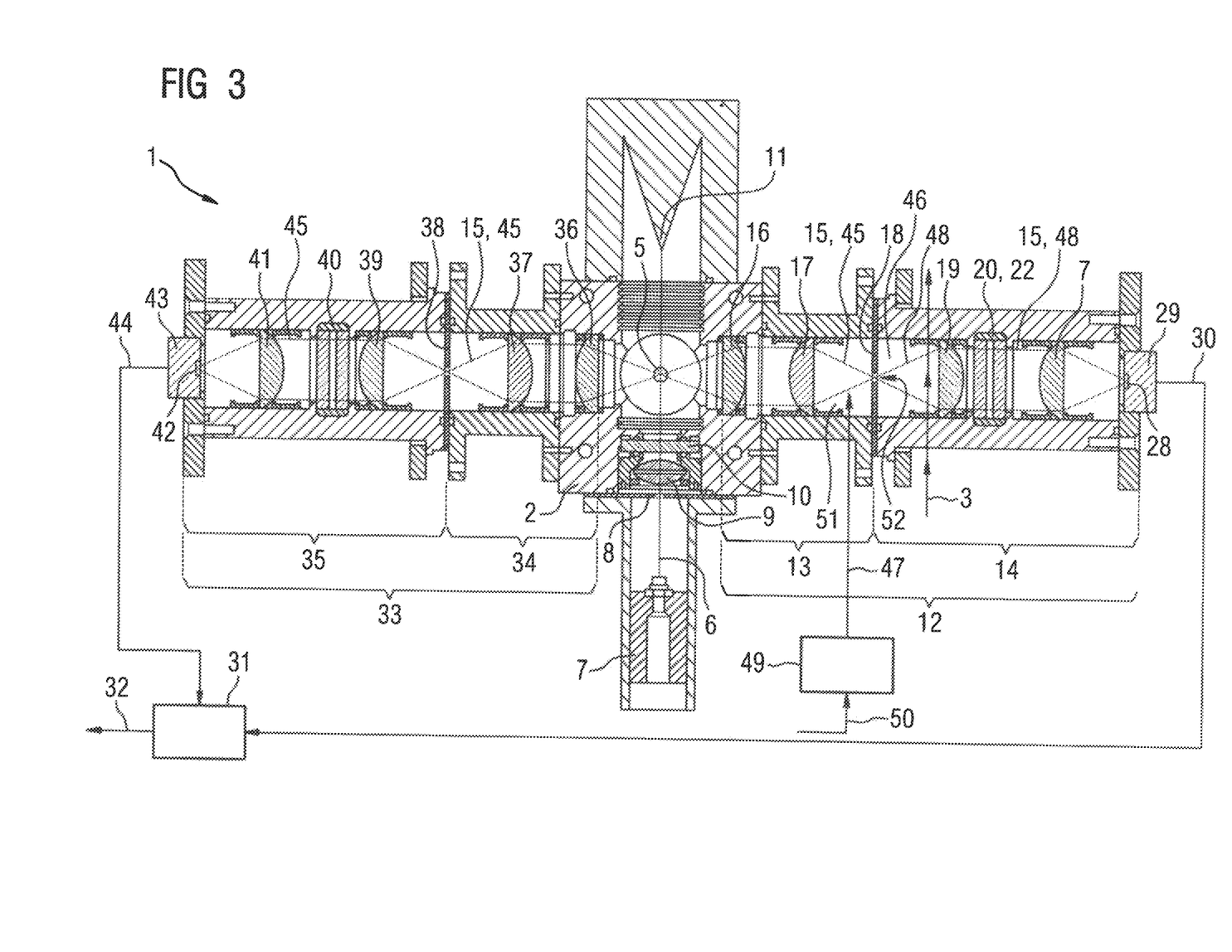
FIG. 3 shows a second sectional representation of the Raman photometer in FIG. 1.

FIG. 3 shows a further sectional representation of the Rahman photometer 1. The first receiving optical system apparatus 12 and the second receiving optical system apparatus 33 for the Raman photons 15, 45 scattered at the molecules of the fluid 3 can be arranged, advantageously attached, on/to the first measuring cell 2 at a right angle to the laser beam 6. Advantageously, the second receiving optical system apparatus 33 is arranged opposite the first receiving optical system apparatus 12. At this point it should be noted that the use of both receiving optical system apparatuses 12, 33 is optional.

One or more component(s) of the fluid 3 can be excited by the laser 7. A plurality of wavelength-specific light emissions 15, 45 can thus be produced in the first measuring cell 2, and these are triggered by laser excitation 6 of different components of the fluid 3.

Different fluid components, which can be excited by laser excitation 6, may also be detected solely by the first receiving optical system apparatus 12 in that different bandpass filters 20, 22, 23, 24, 25, 26 are alternately employed.

The use of the second receiving optical system apparatus 33 is advantageous in order to simultaneously detect the different light emissions 15, 45 from the first measuring cell 2. In this case, different bandpass filters 20, 40 can be used in the first and in the second receiving optical system apparatuses 12, 33, and these are appropriately selected for the respective light emission 15, 45.

The selection of an appropriate bandpass filter 20, 22, 23, 24, 25, 26, 40 for detection of a corresponding Raman radiation 15, 45 can be summarized hi a table as follows.

TABLE 1

Selection of the central wavelength of the bandpass filter for different gas components with a laser with a wavelength of 402 nm.

| Gas component | Raman shift [cm-1] | Relative Raman scatter cross-section for $N_2$ | Central wavelength of the Raman band with a 402 nm excitation [nm] |
|---|---|---|---|
| $H_2$ (hydrogen) | 4155 | 3.9 | 483 |
| $N_2$ (nitrogen) | 2331 | 1 | 444 |
| $CO_2$ (carbon dioxide) | 1285 | 0.8 | 424 |
| | 1388 | 1.1 | 426 |
| | 1265 | | 424 |
| $O_2$ (oxygen) | 1555 | 1.0 | 429 |
| $NO_2$ | 1500 | RRS with 402 | 428 |

TABLE 1-continued

Selection of the central wavelength of the
bandpass filter for different gas components
with a laser with a wavelength of 402 nm.

| Gas component | Raman shift [cm-1] | Relative Raman scatter cross-section for $N_2$ | Central wavelength of the Raman band with a 402 nm excitation [nm] |
|---|---|---|---|
| (nitrogen dioxide) | 1440 | RRS with 402 nm excitation | 427 |
|  | 1315 | RRS with 402 nm excitation | 424 |
|  | 3200 | RRS with 402 nm excitation | 461 |
|  | 3915 | RRS with 402 nm excitation | 477 |
| $H_2O$ | 3650 | 4.5 | 471 |
|  | 3657 |  | 471 |

RRS stands for Resonant Raman Scattering in this case.

From Table 1 it emerges that the measurement of oxygen at 429 nm with a bandpass filter, with a full width of half maximum (FWHM) of 10 nm, of $CO_2$ (up to 15 vol. % contained in the measuring gas 3) can be disrupted. If the bandpass filter for $O_2$ cannot be selected to be appropriately narrow, a bandpass filter for $CO_2$ can also be employed, for example in the filter wheel 21, and a two component determination can be made via a serial measurement (in accordance with the MLR calibration method, matrix inversion in accordance with the method of Multiple Linear Regression). The optimum wavelength for the detection of $NO_2$ lies at 477 nm, with it being possible to rule out a possible cross sensitivity to hydrogen and water by way of a FWHM of the bandpass filter of 10 nm.

The receiving optical system apparatuses 12, 33 can each have two stages 13, 14, and 34, 35, with the scattered light 15, 45 being focused with the aid of one or more lens(es) 16, 17 onto a rectangular diaphragm 18 in the first stage 13, 34 in each case. The diaphragm 18 can be designed, for example, as a slit diaphragm. The opening 52 can have, for example, a size of approx. 1×4 mm.

The scattered light 15, 45 can be spatially filtered by the first stages 13, 34, so only those photons, which were scattered from a limited volume around the focused line segment of the laser beam 6, pass into the respective second stage 14, 35. The entry lens 16, 36 of the respective first stage 13, 34 can serve as a pressure-resistant termination or pressure-resistant window of the first measuring cell 2.

In the respective second stage 14, 35, the scattered light 15, 45 collimated by means of a lens 19, 39 passes through the respective bandpass filter 20, 40. Each of the bandpass filters 20, 22, 23, 24, 25, 26, 40 can be designed in the form of a narrowband (full width of half maximum (FWHM)=5-10 nm for the Raman photons) interference filter or optionally two interference filters located one behind the other. The photons selected gas component-specifically by the respective bandpass filter 20, 40 can be mapped by means of a further lens 21, 41 onto a, for example rectangular, photocathode 28, 42 (for example approx. 1×4 mm in size) of a corresponding photomultiplier 29, 43, by means of which they can be individually detected. Each photomultiplier 29, 43 generates in each case one output signal (for example a Raman signal when the photons from the first measuring cell 2 are detected) 30, 44, which is proportional to the number of photons absorbed by the photocathode 28, 42 per unit of time and is fed to an evaluation facility (processor) 31 for evaluation and ascertaining as well as output 32 of the concentration of the measured fluid components.

The respective photomultiplier 29, 43 serves to convert the Raman photons generated in only a very small number, in particular also owing to the low laser power, into a sufficiently strong output signal 30, 44. In addition, the measurements can be made in the case of elevated pressure in the first measuring cell 2 of, for example, 5 bar absolute, because the number of generated Raman photons and therewith the Raman signal 29, 43 increase proportionally with the measured gas pressure. A pressure regulator (not shown) can be provided for this purpose at the, optionally merged, gas outlets 5.

Provision may be made for use of a laser light source 7 with a wavelength appropriate to the electronic transition in the $NO_2$ molecule in order to allow a sensitive (detection omit below 0.5 ppm (parts per million)) detection of $NO_2$. For example, a wavelength of a laser diode of around 400 nm, for example 402 nm, in particular 405 nm, can be expedient for this purpose. These short wavelengths can also provide for a good Raman photon yield (proportional to $\lambda^{1/4}$) in the case of $O_2$ and further components ($CO_2$ and $N_2$) in the measuring gas 3 and do not cause fluorescence. In the Raman scattering of $NO_2$ it is advantageous that it is possible to make use of the principle of Resonant Raman Scattering (RRS) due to the stimulated emission from the excited electronic energy level. This can result in an approximately 100-fold amplification of the output signal 30, 44 and therewith in an improvement in the detection limit.

The bandpass filters 20, 40 can be selected such that, for example, nitrogen dioxide and oxygen are simultaneously measured in accordance with the Raman measuring method described above.

In addition, the laser power can be limited to below 35 mW to satisfy the ex-protection, it being possible to achieve a detection limit for nitrogen dioxide <1 ppm with a measuring duration of one second.

The Raman photometer 1 also provides a second measuring cell 46. The second measuring cell 46 is, for example, not pressure-resistant. The second measuring cell 46 is designed in such a way that it can be fed with the measuring gas 3 and, when the measuring gas 3 is fed in the second measuring cell 46, at least one second component of the measuring gas 3 in the second measuring cell 46 can be excited by a second excitation 47 different from the first excitation 6.

The second measuring cell 46 can be configured as a chemiluminescence measuring cell. The second component of the measuring gas 3 is, for example, nitrogen monoxide, which is transferred by feeding a reactant, for example ozone 47, into an excited state and emits light—chemiluminescence 48—as a consequence of de-excitation.

The chemiluminescence 48 of the reaction of nitrogen monoxide (NO) with ozone 47 takes place in a range between about 600 nm to 3,000 nm (see for example: http://teaching.shu.ac.uk/hwb.chemistry/tutorials/molspec/lumin1.htm, retrieved on Dec. 17, 2020). The photomultipliers 29, 43 are advantageously sensitive to about 700 nm. It can thus be expedient for the measurement of the chemiluminescence photons to employ a bandpass filter 22 of 650 nm with FWHM of about 100 nm. The respective photomultiplier 29, 43 also serves to convert the chemiluminescence photons 48 into an output signal (chemiluminescence signal) 30. The output signal can thus be, for example, a Raman or a chemiluminescence signal.

The concentration 32 of the first and/or the second component, for example of the nitrogen dioxide and of the nitrogen monoxide, can be ascertained on the basis of the output signals 30, 44.

It may be seen from FIG. 3 that the ozone 47 can be generated in an ozone generator 49. For example, the ozone 47 can be generated either from dry air 50 in a dielectrically hindered gas discharge or be generated with the aid of a UV lamp (for example with an intensity maximum <220 nm). In the case of the UV lamp it is advantageous that no nitrous oxides are generated from the atmospheric nitrogen. The ozone 47 can be fed, for example via a capillary (not shown), to the second measuring cell 46.

The second measuring cell 46 can be designed as part of the optical system facility 12, 33. In particular, the second measuring cell 46 can be configured as an integral component of the first receiving optical system apparatus 12 (FIG. 3) or the second receiving optical system apparatus 33 (not shown).

As shown in FIG. 3, the second measuring cell 46 can be formed by a space arranged between the first and the second stage 13, 14 of the first receiving optical system apparatus 12 slit diaphragm 18 and the (entry) lens 19 of the second stage 14 of the first receiving optical system apparatus 12. The exit lens 17 of the first stage 13 can be configured, for example, as a focusing lens. The entry lens 19 of the second stage can be configured, for example, as a collimating lens.

As can be inferred from FIGS. 1 to 3, the first and the second receiving optical system apparatuses 12, 33 and, in particular, the stages 13, 14, 34, 35 have, for instance, the shape of a hollow cylinder, with the optically active elements (lenses, diaphragms, bandpass filters) being received in the receiving optical system apparatuses 12, 33 and, in particular, in the stage 13, 14, 34, 35. The respective stages 13 and 14 or 34 and 35 can be screwed together. The receiving optical system apparatuses 12, 33 can likewise be screwed to the first measuring cell 2.

It may also be seen from FIG. 3 that the reactant 47 can be fed to the second measuring cell 46 via a chamber 51. The chamber 51 can be formed in the first stage 13 of the first receiving optical system apparatus 12. For example, the chamber 51 can be formed by a space between the exit lens 17 and the slit diaphragm 18. It can be expedient to feed the reactant 47, for example ozone, to the chamber 51 via the capillary.

During the measuring process, in which at least the second component of the fluid 3, for example nitrogen monoxide, is measured, the measuring gas 3 flows through the second measuring cell 46—by way of gas inlets and outlets (not shown here). At the same time the reactant 47 can be fed to the first chamber 51 in such a way that it passes through an opening 52 of the slit diaphragm 18 into the second measuring cell 46. In this case mixing of the reactant 47 with the fluid 3, which results in the chemiluminescence 48, takes place in the region of the opening 52 of the slit diaphragm 18. It can be expedient to select the opening 52 of the slit diaphragm(s) 18, 38 to be the same size as the cathode(s) 28, 42.

The opening 52 of the slit diaphragm 18 can be arranged in a shared focal point of the exit lens 17 of the first stage 13 and the entry lens 19 of the second stage 14. In this way the photons 48 produced by the chemiluminescence can be captured particularly easily and mapped onto the cathode 28 of the photomultiplier 29, As discussed above, a bandpass filter 22 of 650 nm with a FWHM of about 100 nm can be employed in the second stage 14 by means of the filter wheel 21 in order to selectively detect the chemiluminescence photons 48.

The measuring facility 1, as shown in FIGS. 1 to 3, allows simultaneous measurement of nitrogen dioxide (the first component of the fluid 3) and nitrogen monoxide (the second component of the fluid 3). The ozone dosing during the $NO_2$ Raman measurement need not be interrupted, as would be the case if the fluid 3 in the first measuring cell 2 were excited by the laser light 6 and by ozone 47. With such simultaneous excitation in the same measuring cell, the $NO_2$ reaction product in the Raman signal would also be measured during the chemiluminescence measurement. In addition, further nitrous oxides ($N_2O_5$, $NO_3$), which are not detected in the Raman signal of the $NO_2$, would be produced in the reaction of the NO with the excess ozone, so a separate measurement of the NO and $NO_2$ via the two measuring methods is necessary in order to infer the NO concentration 32.

The afore-described measuring method can be easily calibrated with a range of calibrating gases. The measurement can be carried out on a continuous gas flow, with the result being available every second.

Figure 4:
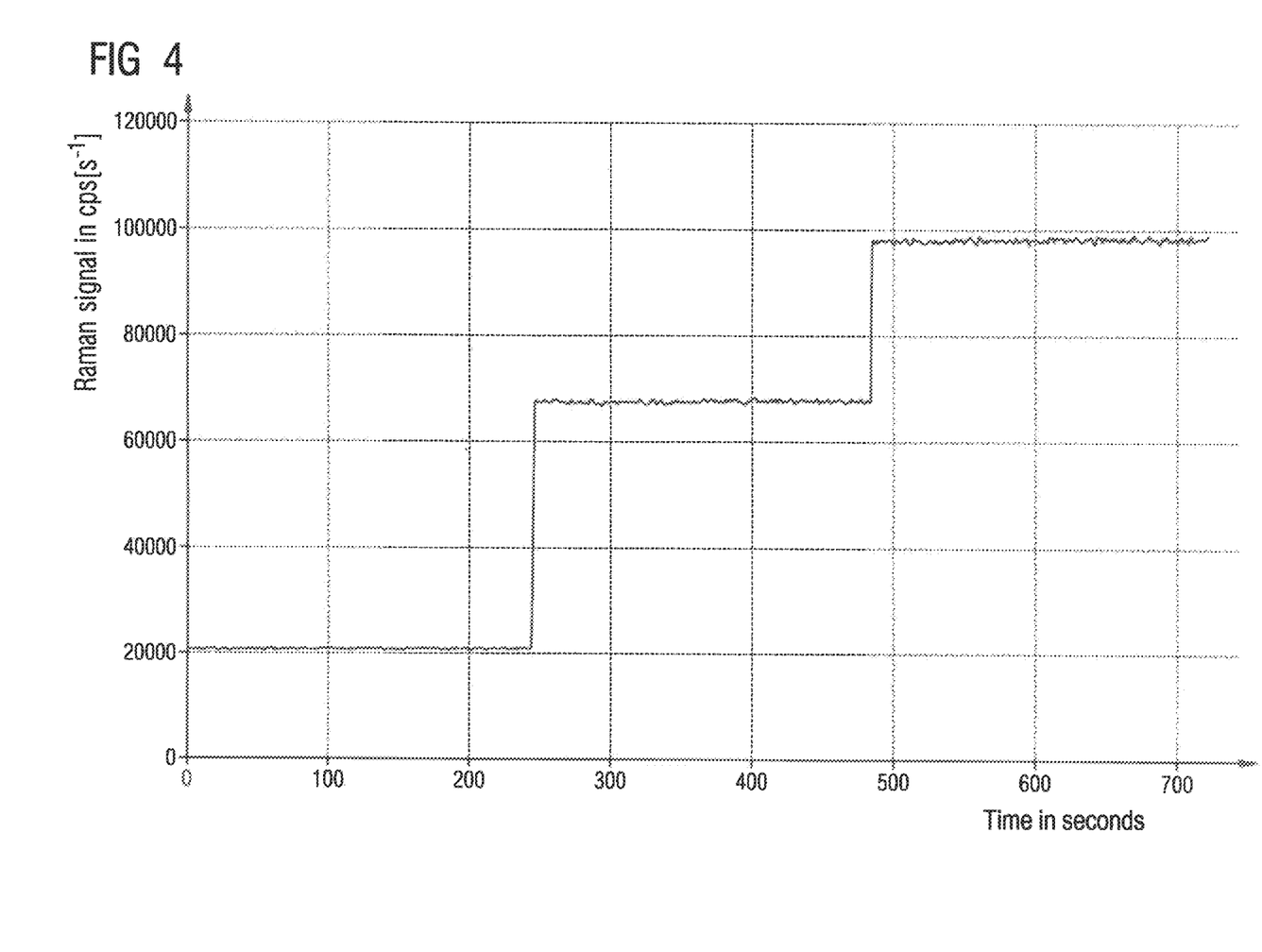
FIG. 4 shows a Raman measurement of 960 mg/ma $NO_2$ with 19.9 vol. % $O_2$.
Figure 5:
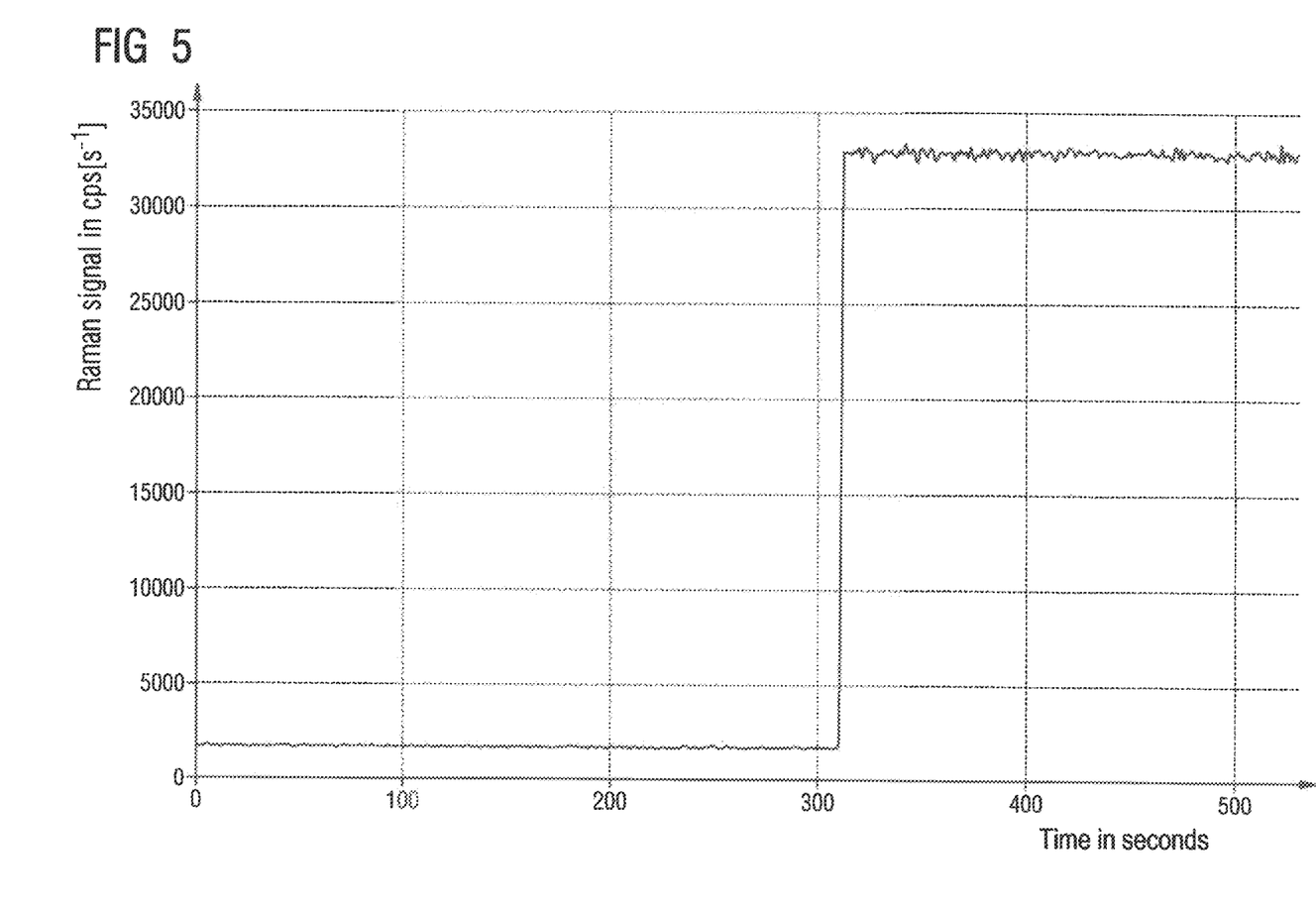
FIG. 5 shows a Raman measurement of synthetic air.
Figure 6:
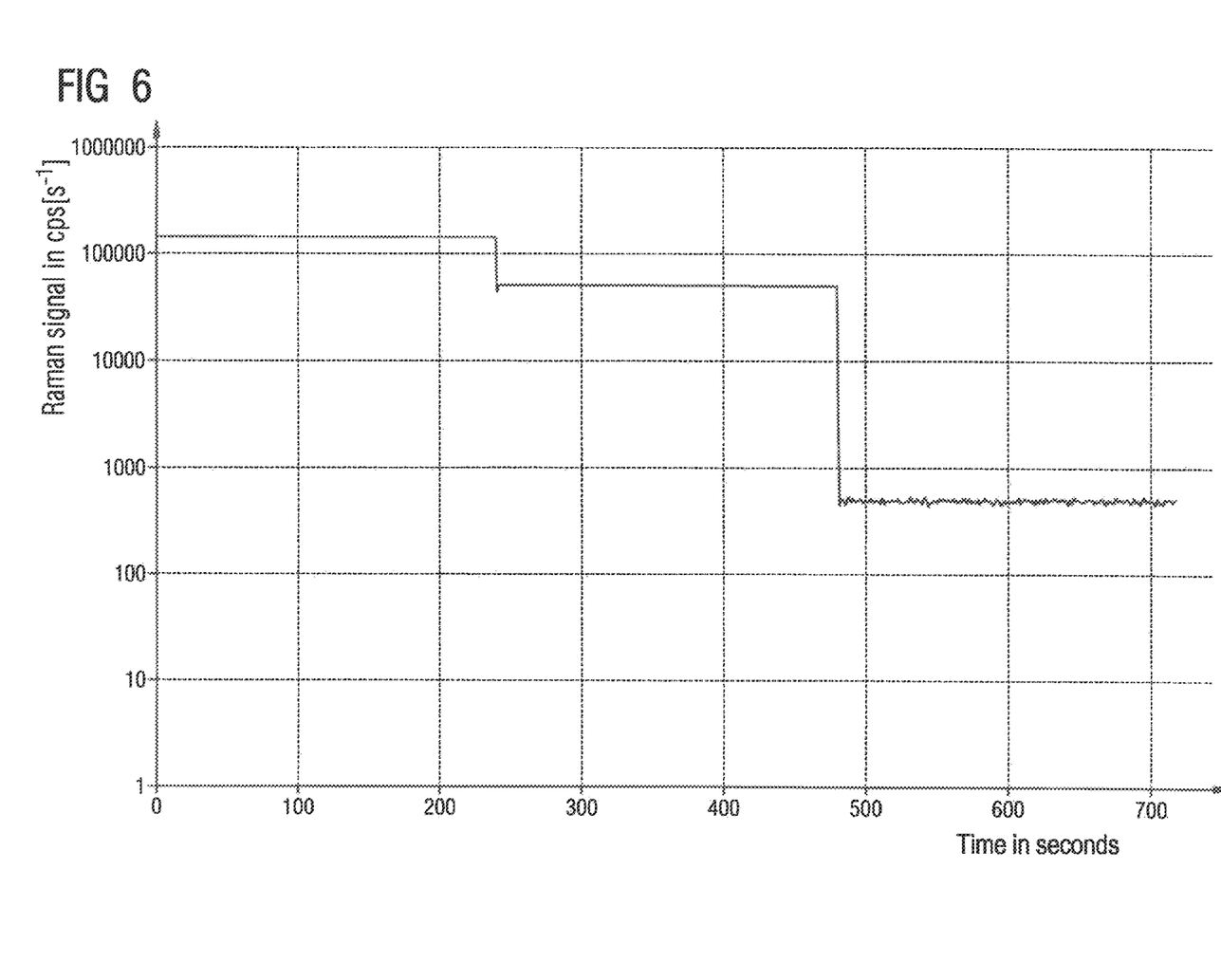
FIG. 6 shows a Raman measurement of 100 vol. % $CO_2$.

FIGS. 4 to 6 show exemplary measuring results for simultaneous determination of the concentrations of $NO_2$ and $O_2$ by means of the measuring facility 1 shown in FIGS. 1 to 3.

The Raman photons 15, 45 from the electronically excited $NO_2$ molecules are counted by the first receiving optical system apparatus 12, fitted with a bandpass filter 20 with a central wavelength (CWL) of 486 nm (or with CWL 477 nm), with the photomultiplier 29.

The $O_2$ measurement takes place with a bandpass filtering facility 40. The bandpass filtering facility 40 comprises a bandpass filter at CWL 430 nm. This bandpass filter can also allow Raman photons of $NO_2$ and $CO_2$ (carbon dioxide) to pass, however. For compensation of the $O_2$ measurement an additional bandpass filter with CWL 420 nm was provided for this reason in the bandpass filtering facility 40 in order to compensate the interference components, for example with the aid of an MLR calibration (matrix inversion in accordance with the method of Multiple Linear Regression), $CO_2$ and $NO_2$.

The following bandpass filters (BPF) for example can be employed in the filter wheel 21:

I. Semrock CWL 420 nm FWHM 5 nm
II. Edmund Optics CWL 430 nm FWHM 10 nm
III. Edmund Optics CWL 486 nm FWHM 10 nm A test gas with the concentration 960 mg/m³ $NO_2$ (rel. measuring uncertainty <2%) was caused to flow through the first measuring cell 2 (1l/min). The test gas also contained 19.9 vol. % O2 for stabilization of the NO2, with the remainder of the test gas being $N_2$, A minimum detectable concentration of 3 mg/m³ (corresponds to approx. 1.5 ppm) resulted on the basis of the noise band, of the Raman signal 30, 44 recorded every second. The detection limit of $O_2$ lies at 0.13 vol. % and of $CO_2$ at 0.22 vol. % in this measurement.

FIG. 4 shows a Raman measurement of 960 mg/m³ $NO_2$ with 19.9 vol. % $O_2$. Signal to 240 sec. with the BPF I. then with BPF II. and from 480 sec. with BPF III. Raman signal in signal pulse per second.

FIG. 5 shows a Raman measurement of synthetic air (80 vol. % N2 with 20 vol. % $O_2$). Signal to 310 sec. with the BPF (bandpass filter) I., thereafter with BPF II. The measurement with BPF III. is not shown because virtually only the background signal of the BPF III. is present (approx. 470 cps (counts per second)).

The measuring results in FIG. 4 and FIG. 5 with approximately equal $O_2$ content of 20 vol. %, exhibit a higher contribution of $NO_2$ in the case of BPF (bandpass filters) I. and II, caused by the Resonant Raman Scattering. The dark signal of the photomultiplier (when the laser is switched off) is at an almost negligible 10 cps but is deducted from the Raman signals.

FIG. 6 also shows a Raman measurement of 100 vol. % $CO_2$. Signal to 240 sec. with the BPF I., then with BPF II. and from 480s with BPF III. with a logarithmic signal scaling.

In a practical exhaust gas application, it can be expedient to compensate the O2 signal (mainly with BPF II.) with the CO2 signal, irrespective of whether the $CO_2$ concentration is higher than 15 vol. % or not.

The combined measuring method for NOx and $O_2$ determination described in the context of this disclosure can be calibrated with a series of test gases (NO, $NO_2$, $O_2$, $CO_2$, all $N_2$ in remainder). The influence of $CO_2$ and $H_2O$ on the chemiluminescence of the NO due to fluorescence quenching can be reduced by the measurement of the specific Raman photons of $CO_2$ and $H_2O$. The measurement can be carried out continuously on the gas flow removed by extraction and the concentrations of the individual components can, due to the clock of the filter wheel, be available at the latest every minute. If the oxygen measurement is omitted, the NOx measurement can also be carried out simultaneously with two receiving optical system. A lower detection limit can be achieved by an increase in the laser power and by averaging the measured values.

The reference characters in the claims serve solely for a better understanding of the present invention and do denote any kind of limitation of the present invention.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for measuring at least two different components of a fluid, said method comprising:
    feeding the fluid to a first measuring cell and a second measuring cell;
    exciting a first component of the fluid in the first measuring cell by a first excitation to trigger a first light emission, wherein the first excitation is a laser excitation and the first light emission is a Raman radiation;
    exciting a second component of the fluid in the second measuring cell by a second excitation which is different from the first excitation, wherein the second excitation is realized by dosing a reactant resulting in a chemiluminescence with the second component of the fluid, thereby triggering a second light emission;
    capturing the first light emission and the second light emission via an optical system facility;
    guiding the first light emission and the second light emission in a direction of a detector facility; and
    measuring by the detector facility the first light emission and the second light emission;
    wherein the optical system facility comprises a first stage and a second stage different than the first stage, with the first stage provided for spatially filtering the Raman radiation, and with the second stage provided for mapping the spatially filtered Raman radiation onto the detector facility; and
    wherein the detector facility is located at one end of the second stage opposite the first measuring cell and the second measuring cell is located in a space between the first stage and the second stage.

2. The method of claim 1, wherein the first component is nitrogen dioxide.

3. The method of claim 1, wherein the reactant comprises ozone and/or the second component is nitrogen monoxide.

4. The method of claim 1, wherein the first light emission is measured using a first bandpass filter and/or the second light emission is measured using a second bandpass filter.

5. The method of claim 1, wherein the first light emission comprises a light emission of the first component and a light emission of a further component different from the first component.

6. A measuring facility for measuring at least two different components of a fluid, said measuring facility comprising:
    a first measuring cell designed to enable the fluid to be fed to the first measuring cell;
    an excitation apparatus operably connected to the first measuring cell and configured to generate a first excitation for exciting a first component of the fluid when the fluid is fed to the first measuring cell;
    a second measuring cell designed to enable the fluid to be fed to the second measuring cell, with the fluid when fed to the second measuring cell causing in the second measuring cell a second component of the fluid to be excited by a second excitation which is different from the first excitation, wherein the second excitation is realized by dosing a reactant resulting in a chemiluminescence with the second component of the fluid;
    an optical system facility comprising a first stage and a second stage different than the first stage, with the optical system facility operably connected to the first measuring cell and the first stage configured to capture and spatially filter a first light emission triggered by the first excitation, wherein the first excitation is a laser excitation and the first light emission is a Raman radiation, and operably connected to the second measuring cell and the second stage configured to capture the chemiluminescence; and
    a detector facility operably connected to the optical system facility to enable the first stage of the optical system facility to guide the first light emission and the second stage of the optical system facility to guide the chemiluminescence in a direction of the detector facility and to map the spatially filtered Raman radiation onto the detector facility, said detector facility configured to measure the Raman radiation and the chemiluminescence; and
    wherein the detector facility is located at one end of the second stage opposite the first measuring cell and the second measuring cell is located in a space between the first stage.

7. The measuring facility of claim 6, further comprising a further excitation apparatus operably connected to the second measuring cell and configured to generate the second excitation in the second measuring cell.

8. The measuring facility of claim 6, wherein the second measuring cell comprises an inlet for the fluid, an outlet for the fluid, and a further inlet for passage into the second measuring cell of a reactant which chemically reacts with the second component of the fluid and generates a chemiluminescence emission.

9. The measuring facility of claim 6, wherein the optical system facility comprises a first receiving optical system apparatus and a second receiving optical system apparatus.

10. The measuring facility of claim 9, wherein the first excitation excites in the first measuring cell in the fluid a further component of the fluid which is different from the first component, so that the first light emission comprises a light emission of the first component and a light emission of the further component, said second receiving optical system apparatus being operably connected to the first measuring cell and configured to select the light emission of the further component and to guide it in the direction of the detector facility, said detector facility being operably connected to the second receiving optical system apparatus and configured to measure the light emission of the further component.

11. The measuring facility of claim 5, wherein the optical system facility comprises a bandpass filtering facility configured to select fluid component-specific light emissions.

12. The measuring facility of claim 6, with the second stage provided for selecting the spatially filtered.

* * * * *

UNITED STATES PATENT AND TRADEMARK OFFICE
CERTIFICATE OF CORRECTION

PATENT NO. : 12,241,831 B2
APPLICATION NO. : 17/739924
DATED : March 4, 2025
INVENTOR(S) : Camiel Heffels and Konstantin Harr Page 1 of 1

It is certified that error appears in the above-identified patent and that said Letters Patent is hereby corrected as shown below:

In the Claims

In Column 12, Claim 6, Line 65: after "first stage" insert --and the second stage--;

In Column 13, Claim 12, Line 28: after "spatially filtered" insert --Raman radiation--.

Signed and Sealed this
Eighth Day of April, 2025

Coke Morgan Stewart
*Acting Director of the United States Patent and Trademark Office*